(12) United States Patent
Carroll

(10) Patent No.: US 12,115,946 B2
(45) Date of Patent: Oct. 15, 2024

(54) WINDSHIELD WASHER COWLING

(71) Applicant: WiperFill Holdings, LLC, Jupiter, FL (US)

(72) Inventor: Matthew R. Carroll, Jupiter, FL (US)

(73) Assignee: Wiperfill Holdings, LLC, Jupiter, FL (US)

( * ) Notice: Subject to any disclaimer, the term of this patent is extended or adjusted under 35 U.S.C. 154(b) by 327 days.

(21) Appl. No.: 17/651,111

(22) Filed: Feb. 15, 2022

(65) Prior Publication Data

US 2023/0166693 A1    Jun. 1, 2023

Related U.S. Application Data

(60) Provisional application No. 63/284,781, filed on Dec. 1, 2021.

(51) Int. Cl.
| | |
|---|---|
| *B60S 1/50* | (2006.01) |
| *B62D 25/08* | (2006.01) |
| *C02F 1/00* | (2023.01) |
| *C02F 103/00* | (2006.01) |

(52) U.S. Cl.
CPC .............. *B60S 1/50* (2013.01); *B62D 25/081* (2013.01); *C02F 1/001* (2013.01); *C02F 2103/001* (2013.01); *C02F 2201/008* (2013.01)

(58) Field of Classification Search
CPC ................ B60S 1/48; B60S 1/50; B60H 1/28
USPC ......................................................... 296/192
See application file for complete search history.

(56) References Cited

U.S. PATENT DOCUMENTS

| | | | |
|---|---|---|---|
| 2,701,897 A | | 2/1955 | Leming |
| 2,703,127 A | | 3/1955 | Webb |
| 2,770,017 A | | 11/1956 | Oishei et al. |
| 3,738,575 A | | 6/1973 | Somer |
| 5,261,254 A | | 11/1993 | Cattane |
| 5,347,661 A | | 9/1994 | Fly et al. |
| 5,561,882 A | * | 10/1996 | Eustache .................. B60S 1/50 |
| | | | 15/250.04 |
| 5,669,986 A | | 9/1997 | Buchanan, Jr. et al. |
| 5,797,159 A | * | 8/1998 | Berge ....................... B60S 1/50 |
| | | | 15/250.31 |
| 5,946,763 A | * | 9/1999 | Egner-Walter ............ B60S 1/50 |
| | | | 15/250.02 |
| 6,024,803 A | * | 2/2000 | Buchanan, Jr. ...... B62D 25/081 |
| | | | 15/103 |
| 6,089,620 A | | 7/2000 | Mota Lopez et al. |

(Continued)

FOREIGN PATENT DOCUMENTS

| | | |
|---|---|---|
| DE | 4101820 | 7/1992 |
| DE | 4436023 | 4/1995 |

(Continued)

*Primary Examiner* — Amy R Weisberg
*Assistant Examiner* — Veronica M Shull
(74) *Attorney, Agent, or Firm* — McHale & Slavin, P.A.

(57) ABSTRACT

A windshield cowling and system for collecting and conditioning rainwater from the windshield of a vehicle and utilizing the collected fluid to replenish the fluids in a conventional windshield washer reservoir. Rainwater from the windshield cowling is directed through a leading edge to a conditioning cartridge capable of treating the fluid with a surfactant to form a mixed fluid. Hatches in the cowling allow access to the existing windshield washer fluid reservoir. The conditioning cartridge is disposable and accessible directly through the cowling.

19 Claims, 4 Drawing Sheets

(56) References Cited

U.S. PATENT DOCUMENTS

| | | | |
|---|---|---|---|
| 6,266,842 | B1 | 7/2001 | Muller |
| 9,000,000 | B2 | 4/2015 | Carroll |
| 9,650,018 | B2 | 5/2017 | Carroll |
| 10,093,283 | B2 | 10/2018 | Carroll |
| 10,150,453 | B2 * | 12/2018 | Busiello ............. B01D 21/0045 |
| 10,723,324 | B2 | 7/2020 | Carroll |
| 2004/0112411 | A1 | 6/2004 | Boykin et al. |
| 2006/0244288 | A1 * | 11/2006 | Sandhu ................ B62D 25/081 |
| | | | 296/192 |
| 2014/0230959 | A1 * | 8/2014 | Uyanik ..................... B60S 1/50 |
| | | | 141/82 |
| 2015/0203075 | A1 | 7/2015 | Carroll |
| 2020/0198590 | A1 | 6/2020 | Carroll |

FOREIGN PATENT DOCUMENTS

| | | |
|---|---|---|
| DE | 19546085 | 6/1997 |
| DE | 19858635 | 6/2000 |
| DE | 19912294 | 9/2000 |
| DE | 20022285 | 7/2001 |
| DE | 10057980 | 12/2002 |
| DE | 10138466 | 4/2003 |
| DE | 102005055714 | 3/2007 |
| EP | 1053922 | 11/2000 |
| WO | WO2007020540 | 2/2007 |

* cited by examiner

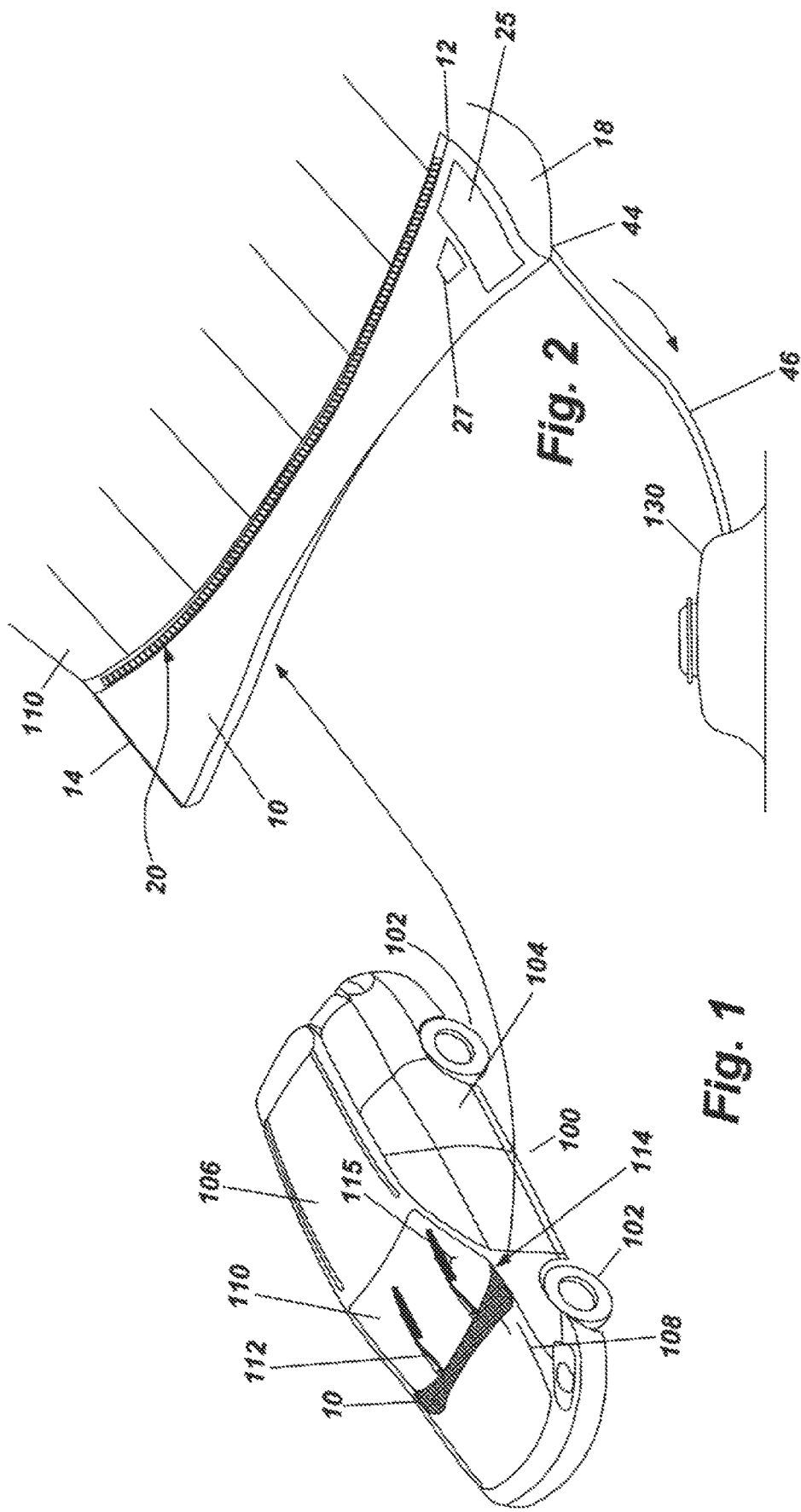

WINDSHIELD WASHER COWLING

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/284,781, entitled "WINDSHIELD WASHER COWLING," filed Dec. 1, 2021. The contents of which the above referenced application is incorporated herein by reference.

FIELD OF THE INVENTION

The present invention relates generally to windshield washing and, in particular, to a cowling for use in recovering windshield runoff, wherein the runoff fluid is conditioned and directed to an existing windshield fluid reservoir for use in cleaning of a windshield.

BACKGROUND OF THE INVENTION

Windshield cleaning systems for use on vehicles are known in the art. Standard on most every vehicle manufactured, windshield cleaning systems provide a means for removing dirt, bugs, and the like debris from the windshield, thereby improving visibility for the operator of the vehicle. Conventional windshield cleaning systems consist of a washer reservoir containing a fluid that is sprayed onto the windshield to loosen the debris, wherein wiper blades are activated for removing the loosen debris. The windshield washer fluid consists of water which may include additives to enhance debris removal and prevent the fluid from freezing when the vehicle is operated in cold climates. Other additives to the fluid may include substances which enhance the cleaning properties of the fluid in the reservoir, such as deicer, rain repellants, and the like.

Extensive use of a windshield cleaning system typically occurs in a wet environment. For instance, during and after a rain storm, the wheels of a vehicle will sling moisture laden with road grime onto a following vehicle. This is especially noticeable when a vehicle is following a semi-tractor trailer. The road grime can quickly inhibit the visibility of the vehicle operator. Another example is snow slush, which may splash onto the windshield of a vehicle, wherein the operator of the vehicle utilizes the windshield washer system to provide a clear view for the vehicle operator.

Continuous use of the windshield washer system can result in exhaustion of the fluid stored in the washer reservoir. If the vehicle operator is not vigilant in refilling the washer reservoir with fluid, the operator may be without the ability to clean the windshield when the need arises. It is common knowledge that a windshield covered with debris significantly reduces operator visibility. In a sunlit environment, light refraction further reduces the ability for the operator to see through the windshield, making for a most dangerous scenario. In such instances, the visibility through the windshield could be reduced significantly, essentially blinding the vehicle operator.

In addition, windshield fluid reservoirs are mounted within the engine compartment of a vehicle. Raising the hood of a vehicle can be difficult for vehicle operators that are mechanically or physically challenged. Access to the windshield fluid reservoir without having to raise the hood to the engine would be beneficial to such vehicle operators.

What is lacking in the art is a windshield washer cowling that allows for the conditioning of windshield runoff, said cowling including hatches for servicing of the windshield washer system without having to open the vehicle engine hood.

DESCRIPTION OF RELATED ART

The contents of Applicant's previous U.S. Pat. Nos. 9,000,000; 9,650,018; 10,093,283 and 10,723,324 are incorporated herein by reference. Each of the previous registrations is directed to a vehicular windshield washer fluid replenishing system for conditioning and treating rainwater that is collected from the windshield. In one embodiment, the vehicular windshield washer includes an ion exchange conditioner and a mixing chamber to add a fluid concentrate to the collected raw water. In another embodiment, a mixing chamber contains a fluid concentrate with a wick extending from the concentrate chamber to the mixing chamber for providing a capillary draw of fluid concentrate from the concentrate chamber to the mixing chamber. In yet another embodiment, a cartridge pretreated with a surfactant capable of conditioning collected water is employed.

SUMMARY OF THE INVENTION

Disclosed is a vehicle cowling for use in recovering rainwater, dew and snow fluids that run off a windshield. The cowling is constructed and arranged to house a collection trough that drains to a collection chamber, wherein fluid is conditioned before being directed to a conventional wiper fluid reservoir. The windshield washer cowling includes one hatch to allow fluid to be directly added to the existing wiper fluid reservoir and another hatch to service the collection system without having to lift the engine hood for access to the wiper fluid reservoir.

In a preferred embodiment, water collected from the windshield is directed through a screen, filtered, and then directed through a fluid conditioning cartridge. In one embodiment the fluid conditioning cartridge is formed from an open cell polyurethane containing a surfactant. The surfactant may be water repellant or a streak free mixture. Optionally, an anti-freeze material can be added for use in cold environments. Fluids collected are passed through the conditioning cartridge before delivery to the windshield washer reservoir.

It is an objective of the present invention to provide a windshield cowling for collecting and conditioning of water runoff to replenish a windshield washer reservoir of a vehicle.

It is a further objective of the present invention to collect rain, dew, snow or any other moisture runoff from a windshield to replenish the fluids in a windshield washer reservoir of a vehicle, wherein the operator of a vehicle will always have an automatically replenished supply of windshield wiper fluid available.

It is yet another objective of the present invention to provide a cowling having access hatches to eliminate the need to lift the engine hood for filling an existing fluid reservoir.

Still another objective of the present invention is to provide a hatch for servicing of replaceable or cleanable filters and screens used in treating the fluid before being directed to an existing windshield washer reservoir.

It is still yet a further objective of the present invention to provide a mixing cartridge constructed from an open cell polyurethane structure having a surfactant or glass conditioner impregnated into the cartridge; fluid passing through the cartridge slowly removing surfactant to replenish the fluids in a windshield washer with a treated fluid.

Still another objective of the invention is to provide a large but discrete cowling leading edge for collection of water that runs off the width of the windshield.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 1 is a pictorial view of a vehicle having a windshield cowling of the present invention;

FIG. 2 is a pictorial view of the vehicle cowling;

DETAILED DESCRIPTION OF THE INVENTION

Figure 3:
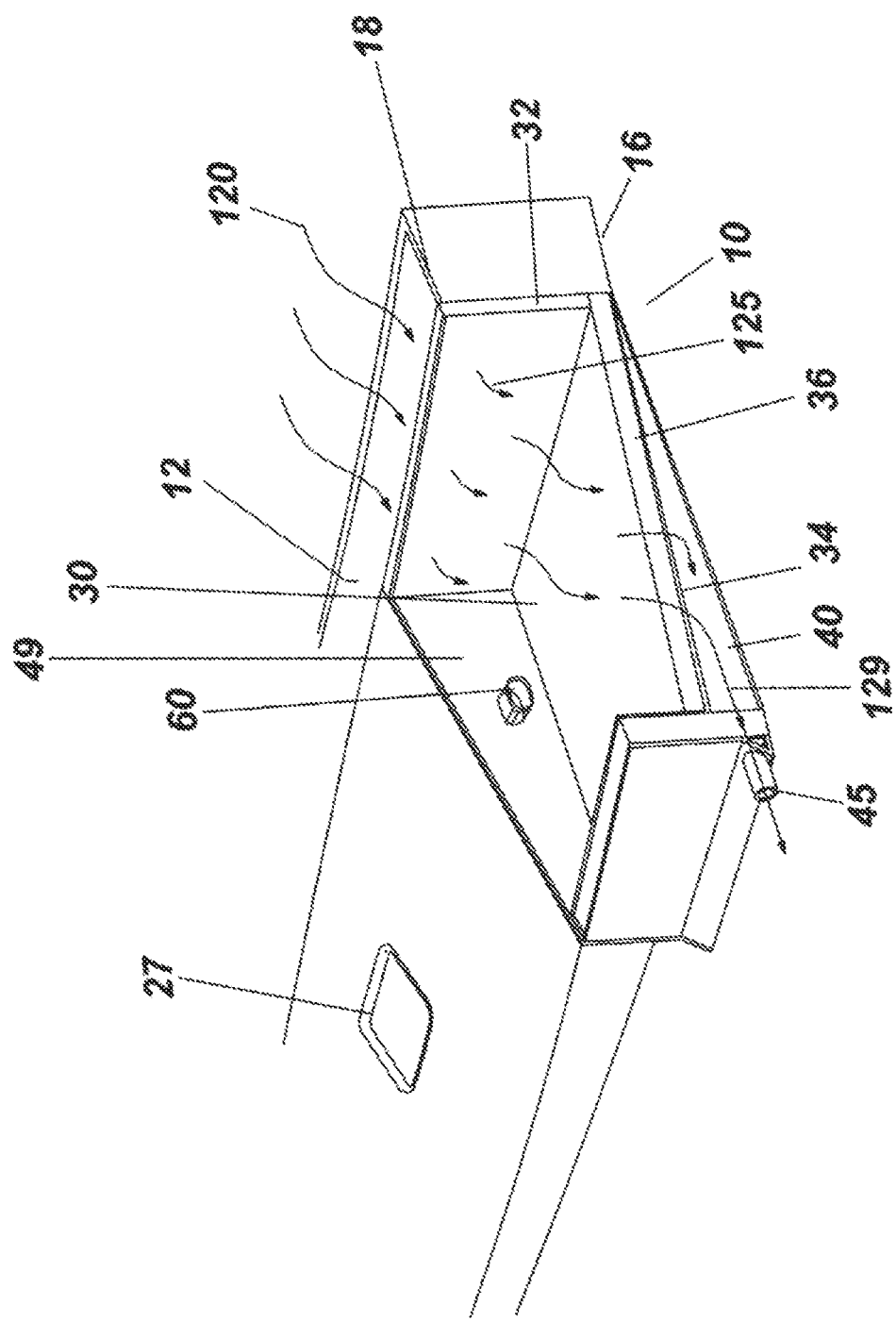
FIG. 3 is a cross-sectional view of the fluid conditioner.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to the figures, a conventional vehicle 100 is illustrated having wheels 102, doors 104, a roof 106, an engine hood 108, and a windshield 110. The windshield 110 is cleaned by windshield wipers 112 that include spray nozzles 115 capable of placing washer fluid drawn from a fluid reservoir 130 onto the windshield. A windshield cowling 10 is located at the base 114 of the windshield 110 and behind the engine hood 108. A collection trough 12 extends from a first edge 14 to a second edge 18; the collection trough 12 is sloped from the first edge 14 by use of a base wall 16 having an elevation that is slightly higher on one edge. A grill 20 is placed over the collection trough 12 to prevent leaves and the like large debris from entering the collection trough 12. The grill 20 can be constructed of plastic, metal or aluminum, with spacing sufficient to only allow water to pass. The water is collected from condensation including rain, snow and ice draining off the hood 108 and windshield 110.

Referring to the figures in general, the hatch 25 is the lid for the collection chamber 30, with serviceable items including a screen 32 forming a wall between the collection trough 12 and the collection chamber 30. A lower wall 34 includes a perforated support for a filter 36 having a micron rating of about 30 microns to assure fluid passage will not clog existing windshield washer spray nozzles 115. In the preferred embodiment, the filter 36 is pleated to increase the available surface area for filtering of fluid.

Water collected 120 is directed through the screen 32 before entry into the collection chamber 30. The screened water 125 is directed through the filter 36, allowing passage into a lower chamber 40 which is fluidly connected to a conditioning cartridge 42. The conditioning cartridge 42 is releasably secured along a front wall 44 of the collection chamber 30. In one embodiment the conditioning cartridge 42 is formed from an open cell polyurethane material containing an embedded surfactant. In this embodiment, the conditioning cartridge 42 is saturated with the surfactant which is dried, leaving the surfactant adhering to the cell structure. Once dry, the condition cartridge 42 bleeds the surfactant when filtered fluid 129 is passed through the conditioning cartridge 42 through an outlet 45 which is fluidly coupled to the reservoir 130 by a flexible coupling tube 46.

Figure 4:
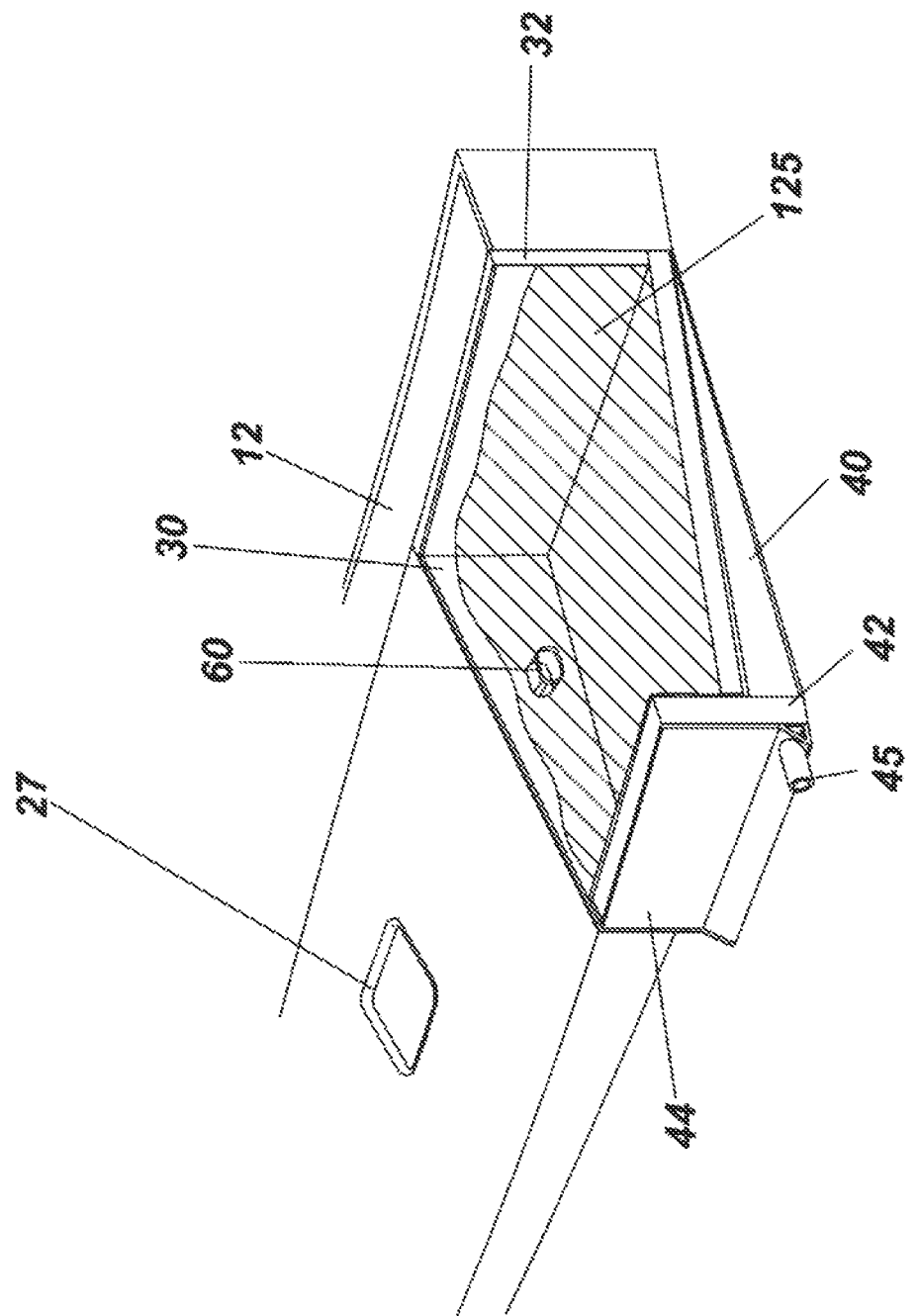
FIG. 4 is a cross-sectional view of the fluid conditioner with fluid present.
Figure 5:
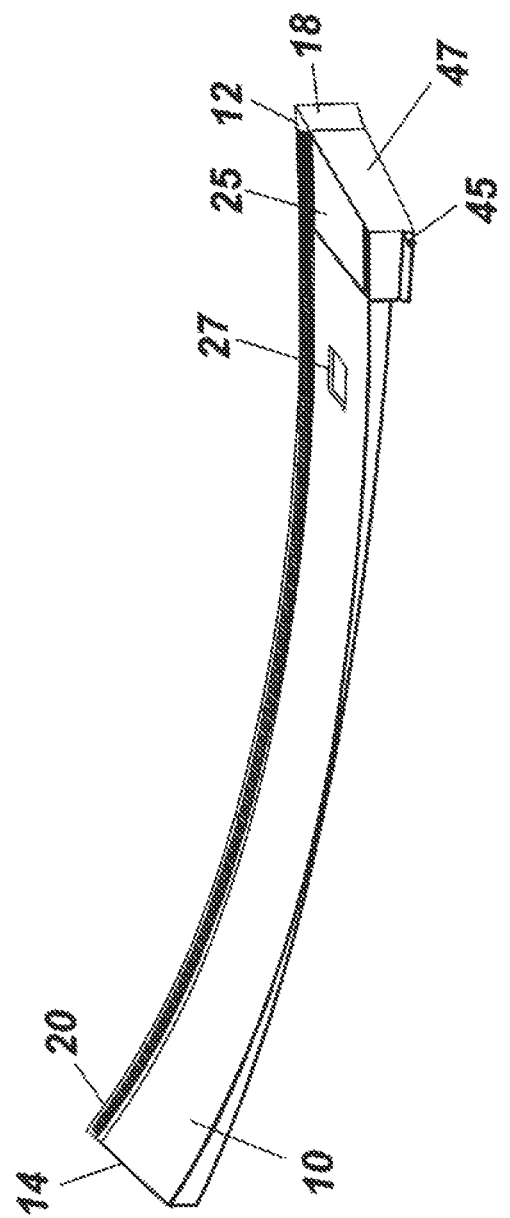
FIG. 5 is a perspective view of a vehicle cowling.

In addition, a substance capable of lowering the freezing temperature of fluid can be impregnated or integrated into the conditioning cartridge 42. For instance, a solution of hydrogen borate or boric acid may be added to the cartridge 42 by first hydrating the solution and cell structure, followed by drying the cartridge to remove the moisture. In a similar manner, with the addition of the surfactant to the fluid, the filtered fluid 129 passes through the cartridge 42 to draw anti-freeze material, forming a mixed solution before direction to the reservoir 130, thereby lowering the freezing temperature of the fluid within the windshield washer reservoir 130. The conditioning cartridge 42 can be easily replaced upon exhaustion by lifting of the hatch 25, wherein the cartridge 42 can be removed. FIGS. 3 and 4 depict the collection chamber in a cut-away format, wherein a side wall 47 has been removed, shown in FIG. 5, having a similar shape as opposite sidewall 49. The conditioning cartridge 42 can be stored indefinitely.

The cowling 10 includes a second hatch 27 for use in adding wiper fluid and/or antifreeze directly to the existing reservoir 130. The second hatch 27 provides an opening that is coupled to outlet 60, allowing the addition of a conditioner, such as antifreeze, to be added to the screened water 125 in a liquid format. Circulating the additive to the washer reservoir 130 can be accomplished by activating the system, wherein the additive is drawn through the conditioning cartridge 42 and coupling tube 46. The cowling hatches 25 and 27 eliminate the need to raise the engine hood 108 for accessing the windshield washer fluid replenishing system.

The system allows for the conditioning and treating of water that impacts the windshield 110 of a vehicle 100 to supplement a pre-existing windshield washer reservoir. In operation, fluid collected from the windshield 110 of a vehicle 100 is directed through the grill 20 for passage into the collection trough 12. The collection trough 12 directs the collected water through a cleanable screen 32 used to remove large particles. The screened water 125 is passed through the filter 36, wherein the filtered fluid 129 is collected in a second chamber 40 and directed through conditioning cartridge 42; the conditioning cartridge 42 containing a surfactant or the like conditioner for treatment of the windshield. Optionally, an anti-freeze concentrate, of a formulation that will bleed slowly to provide longevity of the additive, can be including in the cartridge 42. If the collection trough 12 is full, excess water coming off the windshield will be denied entry until fluid is drawn from the washer reservoir 130.

In the preferred embodiment, the conditioning cartridge 42 may be constructed of a transparent or translucent material, allowing ease of inspection of the concentrate level. In one embodiment the additive to the conditioning cartridge 42 changes the color of the polyurethane. For instance, the polyurethane can be a clear, color free material. A surfactant added to the polyurethane is preferably colored, which effectively hides the clear polyurethane. By way of example, a surfactant colored red would conceal the clear polyurethane and, as the surfactant is bled away, the clear polyurethane can be viewed. It should be noted that clear polyurethane is only an example; the polyurethane may be of any color and is frequently milky white. Further, polyurethane is but one example of an open cell material; random-celled hydrophilic urethane or the like may also be employed.

The term "coupled" is defined as connected to although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A vehicular windshield washer fluid replenishing system for a vehicle windshield washer reservoir comprising:
   a windshield cowling positioned at the base of a windshield of a vehicle, said windshield cowling extending about a width of the vehicle, having a first edge approximating a first side of the vehicle and a second edge approximating a second side of the vehicle;
   a collection trough for receipt of water draining from said vehicle windshield, said collection trough extending between said first edge and said second edge having a common base wall, elevation of said base wall is higher along said first edge arranged to allow drainage of said trough;
   a collection chamber positioned near said second edge and fluidly coupled to said collection trough for receipt of water drained into said collection trough, said collection chamber accessible by a first hatch secured to said windshield cowling;
   a filter securable to said collection chamber, said filter positioned between said collection chamber and an inlet to a lower chamber, wherein water held in said collection chamber is filtered before passing to said lower chamber;
   a conditioning cartridge fluidly coupled to said lower chamber, said conditioning cartridge containing at least one surfactant to form a conditioned fluid; and
   an outlet formed along a base of said conditioning cartridge for directing the conditioned fluid to the vehicle windshield washer reservoir.

2. The vehicular windshield washer fluid replenishing system according to Claim 1, wherein said collection chamber is formed integral with said windshield cowling.

3. The vehicular windshield washer fluid replenishing system according to Claim 1, wherein said the positions of the edges is reversed.

4. The vehicular windshield washer fluid replenishing system according to Claim 1, including a screen positioned between said collection trough and said collection chamber.

5. The vehicular windshield washer fluid replenishing system according to Claim 1, including a grill positioned over said collection trough.

6. The vehicular windshield washer fluid replenishing system according to Claim 1, wherein said conditioning cartridge includes an open cell structure constructed of polyurethane for a controlled release of the surfactant.

7. The vehicular windshield washer fluid replenishing system according to Claim 1, wherein said surfactant is dry, being integrated into open cells of said conditioning cartridge.

8. The vehicular windshield washer fluid replenishing system according to Claim 1, including a dry anti-freeze compound being integrated into open cells of said conditioning cartridge, wherein said antifreeze is used to lower the fluid freezing temperature.

9. The vehicular windshield washer fluid replenishing system according to Claim 1, wherein said filter is capable of trapping particulates greater than 30 microns from fluid.

10. The vehicular windshield washer fluid replenishing system according to Claim 1, wherein said filter is pleated.

11. The vehicular windshield washer fluid replenishing system according Claim 6, wherein said open cell structure is formed of a first color and said surfactant is a second color, whereby said open cell structure returns to said first color when said surfactant is expended.

12. A vehicular windshield washer fluid replenishing system for a vehicle windshield washer reservoir comprising:
   a windshield cowling positioned at the base of a vehicle's windshield, said windshield cowling extending about a width of the vehicle, having a first edge approximating a first side of the vehicle and a second edge approximating a second side of the vehicle;
   a collection trough for receipt of water draining from said vehicle windshield, said collection trough extending between said first edge and said second edge having a common base wall, elevation of said base wall is higher along said first edge arranged to allow drainage of said trough;
   a grill positioned over said collection trough;
   a collection chamber positioned near said second edge and fluidly coupled to said collection trough for receipt of water drained into said collection trough, said collection chamber accessible by a first hatch secured to said windshield cowling and formed integral to said cowling;

a screen positioned between said collection trough and said collection chamber;

a filter securable to said collection chamber, said filter positioned between said collection chamber and an inlet to a lower chamber, wherein water held in said collection chamber is filtered before passing to said lower chamber;

a conditioning cartridge fluidly coupled to said lower chamber, said conditioning cartridge being disposable; and an outlet formed in along a base of said of said conditioning cartridge for directing the conditioned fluid to the vehicle windshield washer reservoir.

13. The vehicular windshield washer fluid replenishing system according to Claim 12, wherein the positions of the edges are reversed.

14. The vehicular windshield washer fluid replenishing system according to Claim 12, wherein said conditioning cartridge is an open cell structure constructed of polyurethane for a controlled release of a surfactant.

15. The vehicular windshield washer fluid replenishing system according to Claim 14, wherein said surfactant is integrated into open cells of said conditioning cartridge.

16. The vehicular windshield washer fluid replenishing system according to Claim 12, including a dry anti-freeze compound being integrated into said conditioning cartridge, wherein said antifreeze is used to lower the fluid freezing temperature.

17. The vehicular windshield washer fluid replenishing system according to Claim 12, wherein said filter is capable of trapping particulates greater than 30 microns from fluid.

18. The vehicular windshield washer fluid replenishing system according to Claim 17, wherein said filter is pleated.

19. The vehicular windshield washer fluid replenishing system according Claim 1, wherein said open cell structure is formed of a first color and said surfactant is a second color, whereby said open cell structure returns to said first color when said surfactant is expended.

* * * * *